US011457106B2

(12) United States Patent
Jin et al.

(10) Patent No.: US 11,457,106 B2
(45) Date of Patent: Sep. 27, 2022

(54) ELECTRONIC APPARATUS AND CONTROL METHOD THEREOF

(71) Applicant: SAMSUNG ELECTRONICS CO., LTD., Suwon-si (KR)

(72) Inventors: Kyoungshin Jin, Suwon-si (KR); Jaeyong Kim, Suwon-si (KR); Minsup Kim, Suwon-si (KR); Hojune Yoo, Suwon-si (KR); Jaemyung Hur, Suwon-si (KR)

(73) Assignee: SAMSUNG ELECTRONICS CO., LTD., Sunwon-si (KR)

( * ) Notice: Subject to any disclaimer, the term of this patent is extended or adjusted under 35 U.S.C. 154(b) by 0 days.

(21) Appl. No.: 17/104,632

(22) Filed: Nov. 25, 2020

(65) Prior Publication Data

US 2021/0211535 A1    Jul. 8, 2021

(30) Foreign Application Priority Data

Jan. 3, 2020    (KR) ........................ 10-2020-0000639

(51) Int. Cl.
  *H04M 1/72*    (2021.01)
  *H04M 1/72412*    (2021.01)
  *H04W 8/00*    (2009.01)

(52) U.S. Cl.
  CPC ....... *H04M 1/72412* (2021.01); *H04W 8/005* (2013.01)

(58) Field of Classification Search
  CPC ....... H04L 67/12; H04L 67/303; H04L 69/24; H04M 1/72412; H04W 8/005
  See application file for complete search history.

(56) References Cited

U.S. PATENT DOCUMENTS

| 10,402,146 B2 | 9/2019 | Oh et al. |
| 2008/0043020 A1 | 2/2008 | Snow et al. |
| 2013/0002949 A1* | 1/2013 | Raveendran ........ H04L 65/4092 348/469 |
| 2013/0328770 A1 | 12/2013 | Parham |

(Continued)

FOREIGN PATENT DOCUMENTS

| JP | 6335738 B2 | 5/2018 |
| KR | 10-1592755 B1 | 2/2016 |

(Continued)

OTHER PUBLICATIONS

Communication dated Mar. 15, 2021 issued by the International Searching Authority in counterpart Application No. PCT/KR2020/016209 (PCT/ISA/210 and PCT/ISA/237).

(Continued)

*Primary Examiner* — Nader Bolourchi
(74) *Attorney, Agent, or Firm* — Sughrue Mion, PLLC

(57) ABSTRACT

Disclosed is an electronic apparatus comprising an interface, a sensor. and a processor configured to detect occurrence of a user event, which corresponds to a command issued to transmit content, through the sensor, identify an external apparatus, which corresponds to the user event, through the interface, identify content to be transmitted and a method of transmitting the content based on current operation circumstances of the electronic apparatus, and transmit the content to the external apparatus through the interface based on the identified method of transmitting the content.

22 Claims, 6 Drawing Sheets

(56) References Cited

U.S. PATENT DOCUMENTS

| | | | |
|---|---|---|---|
| 2014/0223490 A1 | 8/2014 | Pan et al. | |
| 2014/0365611 A1 | 12/2014 | Praveenkumar et al. | |
| 2016/0057271 A1 | 2/2016 | Park | |
| 2017/0103440 A1 | 4/2017 | Xing et al. | |
| 2018/0126862 A1* | 5/2018 | Huh | B60L 50/16 |
| 2018/0137266 A1 | 5/2018 | Kim et al. | |
| 2019/0073180 A1 | 3/2019 | Nunan | |
| 2020/0186641 A1 | 6/2020 | Ma et al. | |

FOREIGN PATENT DOCUMENTS

| | | |
|---|---|---|
| KR | 10-2016-0148375 A | 12/2016 |
| KR | 10-2017-0007980 A | 1/2017 |
| WO | 2012/100218 A1 | 7/2012 |
| WO | 2019/059483 A1 | 3/2019 |

OTHER PUBLICATIONS

Communication dated Apr. 30, 2021 issued by the European Intellectual Property Office in counterpart European Application No. 20208917.3.

* cited by examiner

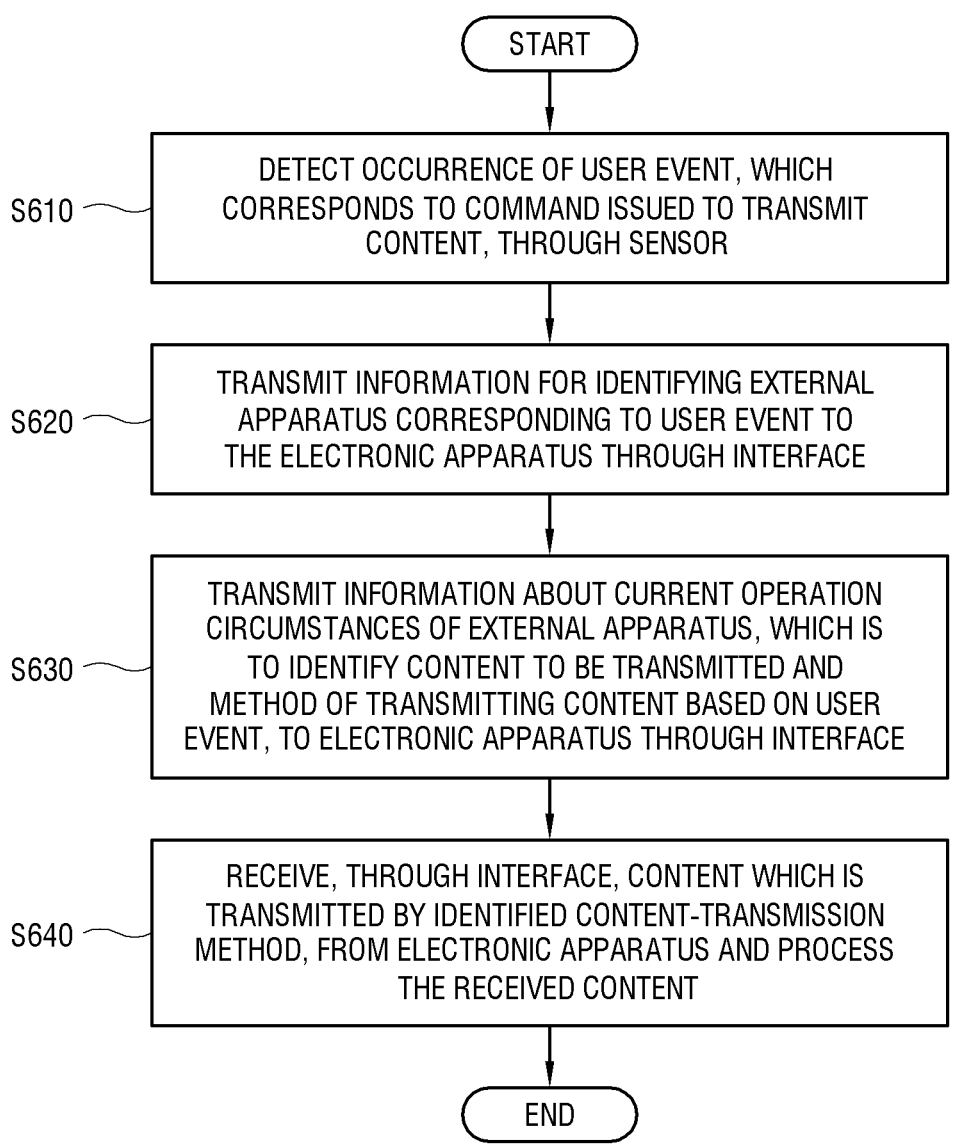

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2020-0000639 filed on Jan. 3, 2020 in the Korean Intellectual Property Office, the disclosure of which is incorporated by reference herein in its entirety.

BACKGROUND

Field

The disclosure relates to an electronic apparatus, which transmits content to another electronic apparatus connected thereto, and a control method thereof.

Description of the Related Art

With recent growing needs for technology that exchanges content between apparatuses for more convenient use of the content, there have been developed various technologies related to a method of transmitting content. Therefore, when many methods are available for transmitting content to another apparatus or when the transmission method is varied depending on the kinds of content, there is a need of selecting the method appropriate to suit circumstances.

In this case, a user needs to know differences between the methods of transmitting content or how to use the method of transmitting the content. However, it is difficult to choose which is better among the transmission methods because the transmission method may be too complicated to use or so many methods may be available for content desired to be transmitted.

SUMMARY

An aspect of the disclosure is to provide an electronic apparatus, which is convenient for a user to use content transmission between the electronic apparatus and another connected apparatus, and a control method thereof.

According to an embodiment of the disclosure, there is provided an electronic apparatus comprising an interface, a sensor, and a processor configured to detect occurrence of a user event, which corresponds to a command issued to transmit content, through the sensor, identify an external apparatus, which corresponds to the user event, through the interface, identify content to be transmitted and a method of transmitting the content based on current operation circumstances of the electronic apparatus, and transmit the content to the external apparatus through the interface based on the identified method of transmitting the content.

The processor may be configured to identify whether the user event occurs, based on whether a sensing value detected by the sensor corresponds to a sensing value previously defined as a user tapped the external apparatus by using the electronic apparatus.

The processor may be configured to identify the external apparatus corresponding to the user event, based on whether information obtained through the sensor corresponds to information obtained in the external apparatus by a sensor of the external apparatus.

The processor may be configured to identify an application currently running in the electronic apparatus, and identify a method of transmitting the content based on the identified application.

The electronic apparatus may further comprise a user input unit, wherein the processor may be configured to identify a method of transmitting the content based on a user input received through the user input unit.

The electronic apparatus may further comprise a storage unit, wherein the processor may be configured to store information about at least one method of transmitting the content, which correspond to previous operation circumstances of the electronic apparatus, in the storage unit, and identify a method of transmitting the content, which corresponds to current operation circumstances of the electronic apparatus, based on the stored information.

The processor may be configured to receive information about current operation circumstances of the external apparatus through the interface, and identify the content to be transmitted and the method of transmitting the content, based on the received information about the current operation circumstances of the external apparatus.

According to an embodiment of the disclosure, there is provided an electronic apparatus comprising an interface, a sensor, and a processor configured to detect occurrence of a user event, which corresponds to a command issued to transmit content, through the sensor, transmit information, which allows an external apparatus to identify the electronic apparatus corresponding to the user event, to the external apparatus through the interface, transmit information about current operation circumstances of the electronic apparatus, which is to identify content to be transmitted and a method of transmitting the content based on the user event, to the external apparatus through the interface, and receive, through the interface, the content transmitted from the external apparatus based on the identified method of transmitting the content and process the received content.

The processor may be configured to transmit information about the current operation circumstances of the electronic apparatus, which shows one content-transmission method among a plurality of content-transmission methods, to the external apparatus.

According to an embodiment of the disclosure, there is provided a method of controlling an electronic apparatus that comprises detecting occurrence of a user event, which corresponds to a command issued to transmit content, through a sensor of the electronic apparatus, identifying an external apparatus, which corresponds to the user event, through an interface of the electronic apparatus, identifying content to be transmitted and a method of transmitting the content based on current operation circumstances of the electronic apparatus, and transmitting the content to the external apparatus through the interface based on the identified method of transmitting the content.

The detecting the occurrence of the user event may comprise identifying whether the user event occurs, based on whether a sensing value detected by the sensor corresponds to a sensing value previously defined as a user tapped the external apparatus with the electronic apparatus.

The identifying the external apparatus corresponding to the user event may comprise identifying the external apparatus corresponding to the user event, based on whether information obtained through the sensor corresponds to information obtained in the external apparatus by a sensor of the external apparatus.

The identifying content to be transmitted and a method of transmitting the content may comprise identifying an application currently running in the electronic apparatus, and identifying a method of transmitting the content based on the identified application.

The identifying a method of transmitting the content may comprise identifying a method of transmitting the content based on a user input received through a user input unit.

The identifying a method of transmitting the content may comprise storing information about at least one method of transmitting the content, which correspond to previous operation circumstances of the electronic apparatus, in a storage unit; and identifying a method of transmitting the content, which corresponds to current operation circumstances of the electronic apparatus, based on the stored information.

The identifying content to be transmitted and a method of transmitting the content may comprise receiving information about current operation circumstances of the external apparatus through the interface, and identifying the content to be transmitted and the method of transmitting the content, based on the received information about the current operation circumstances of the external apparatus.

A method of controlling an electronic apparatus may further comprise detecting occurrence of a user event, which corresponds to a command issued to transmit content, through a sensor of the electronic apparatus, transmitting information, which allows an external apparatus to identify the electronic apparatus corresponding to the user event, to the external apparatus through an interface of the electronic apparatus, transmitting information about current operation circumstances of the electronic apparatus, which is to identify content to be transmitted and a method of transmitting the content based on the user event, to the external apparatus through the interface, and receiving, through the interface, the content transmitted from the external apparatus based on the identified method of transmitting the content and processing the received content.

The transmitting the information to the external apparatus may comprise transmitting information about the current operation circumstances of the electronic apparatus, which shows one content-transmission method among a plurality of content-transmission methods, to the external apparatus.

According to an embodiment of the disclosure, there is provided a non-transitory recording medium stored with a computer program comprising a computer readable code as a code for performing a method of controlling an electronic apparatus, the method of controlling the electronic apparatus comprising: detecting occurrence of a user event, which corresponds to a command issued to transmit content, through a sensor of the electronic apparatus, identifying an external apparatus, which corresponds to the user event, through an interface of the electronic apparatus, identifying content to be transmitted and a method of transmitting the content based on current operation circumstances of the electronic apparatus, and transmitting the content to the external apparatus through the interface based on the identified method of transmitting the content.

According to an embodiment of the disclosure, there is provided a non-transitory recording medium stored with a computer program comprising a computer readable code as a code for performing a method of controlling an electronic apparatus, the method of controlling the electronic apparatus comprising detecting occurrence of a user event, which corresponds to a command issued to transmit content, through a sensor of the electronic apparatus, transmitting information, which allows an external apparatus to identify the electronic apparatus corresponding to the user event, to the external apparatus through an interface of the electronic apparatus, transmitting information about current operation circumstances of the electronic apparatus, which is to identify content to be transmitted and a method of transmitting the content based on the user event, to the external apparatus through the interface, and receiving, through the interface, the content transmitted from the external apparatus based on the identified method of transmitting the content and processing the received content.

BRIEF DESCRIPTION OF THE DRAWINGS

The above and/or other aspects will become apparent and more readily appreciated from the following description of embodiments, taken in conjunction with the accompanying drawings, in which:

FIG. 6 is a flowchart showing operations of an electronic apparatus according to an embodiment of the disclosure.

DETAILED DESCRIPTION OF EMBODIMENTS

Figure 1:
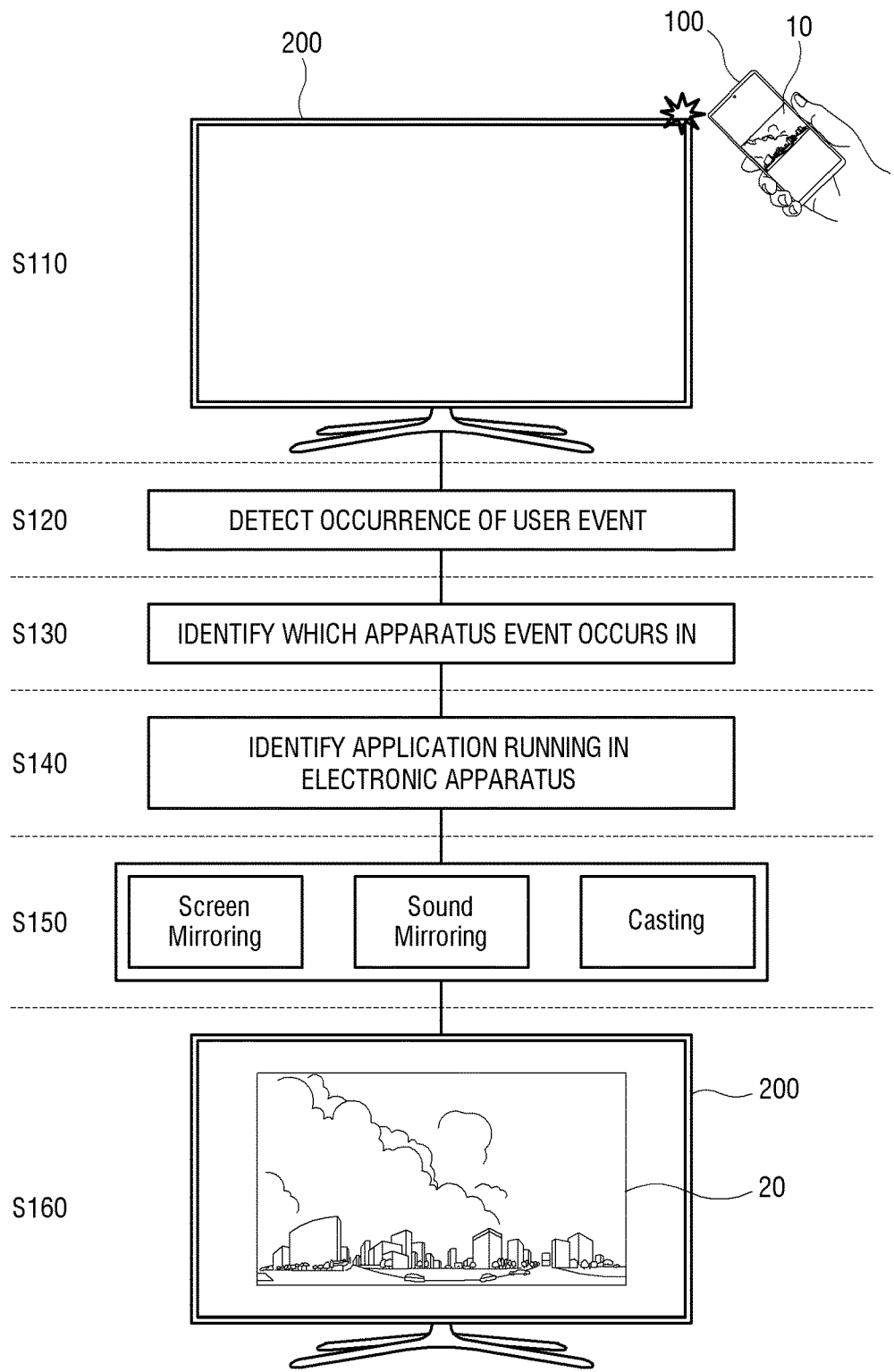
FIG. 1 illustrates a system according to an embodiment of the disclosure.

FIG. 1 illustrates a system according to an embodiment of the disclosure.

FIG. 1 shows an electronic apparatus 100 and an external apparatus 200. In this case, the electronic apparatus 100 and the external apparatus 200 may be embodied as display apparatuses capable of displaying an image. For example, the electronic apparatus 100 and the external apparatus 200 may include a television (TV), a computer, a smartphone, a tablet computer, a portable media player (PMP), a wearable device, a video wall, an electronic frame, etc.

Referring to FIG. 1, a user may tap the external apparatus 200 with the electronic apparatus 100 as a user event for connecting the electronic apparatus 100 and the external apparatus 200 (S110). Therefore, the tap may be a simple and intuitive method of connecting the two apparatuses. However, the tap may merely be one of many realizable operations, and the user event may alternatively include a gesture, a touch, a voice recognition, etc. According to an embodiment of the disclosure, the connection between the two apparatuses is to eventually transmit content from one apparatus to the other apparatus. The tap means the user event corresponding to a command to transmit the content.

When the tap is done, the electronic apparatus 100 and the external apparatus 200 detect occurrence of the user event through their own sensors (S120). The sensor may for example include an acceleration sensor, a gyro sensor, etc. and thus the tap may be identified based on whether vibration of a predetermined level or higher is detected through the sensor.

The electronic apparatus 100 and the external apparatus 200 may identify which apparatus the event occurs in. (S130). In this case, to identify the apparatus where the event occurs, a Bluetooth low energy (BLE) technology, i.e., one of low power communication technologies may be used, or a common server through which the apparatuses are interworking may be used.

The electronic apparatus 100 may identify an application running in the electronic apparatus 100 (S140), and identify an appropriate method of transmitting content based on the identified application and the current operation circumstances of the electronic apparatus 100 (S150). As the method of transmitting the content, there are screen mirroring, sound mirroring, casting, etc. The electronic apparatus 100 transmits content to the external apparatus 200 by the identified content-transmission method, and the external apparatus 200 may display the content (S160).

For example, it will be assumed that a user executes a gallery application in the electronic apparatus 100 and views a picture 10. In this case, to view the picture 10 on a bigger screen, a user may transmit the picture 10 to the external apparatus 200 so that the external apparatus 200 can display the picture 10. When a user moves the electronic apparatus 100 to the external apparatus 200 and taps the external apparatus 200 with the electronic apparatus 100, the electronic apparatus 100 and the external apparatus 200 may detect an impact through their own sensors. Based on the foregoing BLE technology, both the electronic apparatus 100 and the external apparatus 200 can identify which apparatus gives the impact. When both the electronic apparatus 100 and the external apparatus 200 identify each other, the electronic apparatus 100 may identify that the currently running application is the gallery application, and selects screen mirroring as one among methods of transmitting content, i.e., the picture 10 based on the identified application. Therefore, the electronic apparatus 100 can transmit a signal of content, which includes communication information based on a protocol for the screen mirroring, to the external apparatus 200. The external apparatus 200 receives the signal including the communication information, executes the screen mirroring, and displays a picture 20.

According to an embodiment of the disclosure, only a simple tap is enough to carry out the screen mirroring that allows the picture displayed on the electronic apparatus 100 to be mirrored in the external apparatus 200, and therefore a user can easily use the screen mirroring and be satisfied with the use of the service.

Figure 2:
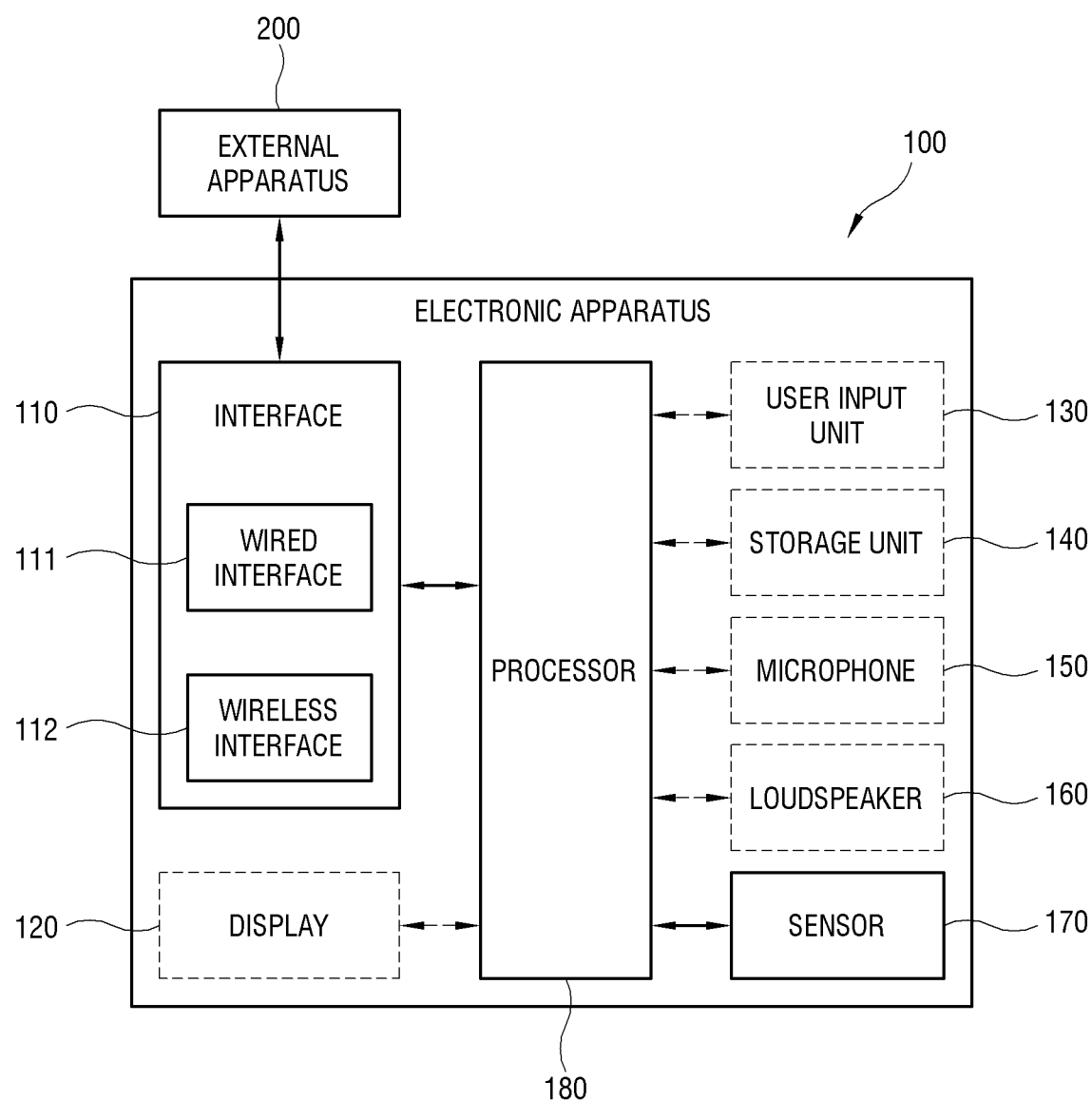
FIG. 2 is a block diagram of an electronic apparatus according to an embodiment of the disclosure.

FIG. 2 is a block diagram of an electronic apparatus according to an embodiment of the disclosure.

As shown in FIG. 2, the electronic apparatus 100 may include an interface 110. The interface 110 may include a wired interface 111. The wired interface 111 may include a connector or port to which an antenna for receiving a broadcast signal based on broadcasting standards for terrestrial/satellite broadcasting, etc. is connected or to which a cable for receiving a broadcast signal based on cable broadcasting standards is connected. Alternatively, the electronic apparatus 100 may include a built-in antenna to receive a broadcast signal. The wired interface 111 may include a high definition multimedia interface (HDMI) port, a DisplayPort, a DVI port, and the like connector or port based on video and/or audio transmission standards such as thunderbolt, composite video, component video, super video, Syndicat des Constructeurs d'Appareils Radiorécepteurs et Téléviseurs (SCART), etc. The wired interface 111 may include a connector or port, etc. based on universal data transmission standards such as a universal serial bus (USB) port. The wired interface 111 may include a connector or port, etc. to which an optical cable based on optical transmission standards is connected. The wired interface 111 may include a connector or port, etc. which connects with an external microphone or an external audio device including microphone, and receives an audio signal from the audio device. The wired interface 111 may include a connector or port, etc. which connects with an audio device such as a headset, an earphone, an external loudspeaker, etc. and transmits or outputs an audio signal to the audio device. The wired interface 111 may include a connector or port based on Ethernet or the like network transmission standards. For example, the wired interface 111 may be embodied by a local area network (LAN) card or the like connected to a router or gateway by a wire.

The wired interface 111 is connected to a set-top box, an optical media player or the like external device, a loudspeaker, a server, etc. in a manner of 1:1 or 1:N (where, N is a natural number) through the foregoing connectors or ports by a wire, thereby receiving a video/audio signal from the connected external device or transmitting a video/audio signal to the connected external device. The wired interface 111 may include connectors or ports to transmit the video/audio signals individually.

Further, according to this embodiment, the wired interface 111 may be internally provided in the electronic apparatus 100, or may be detachably connected to the connector of the electronic apparatus 100 as provided in the form of a dongle or module.

The interface 110 may include a wireless interface 112. The wireless interface 112 may be variously embodied corresponding to the electronic apparatus 100. For example, the wireless interface 112 may use wireless communication methods such as radio frequency (RF), Zigbee, Bluetooth, Wi-Fi, ultra wideband (UWB), near field communication (NFC), etc. The wireless interface 112 may be embodied by a wireless communication module based on Wi-Fi, a wireless communication module for Bluetooth or the like one-to-one direct wireless communication. The wireless interface 112 performs wireless communication with a server on a network, thereby exchanging a data packet with the server. The wireless interface 112 may include an infrared (IR) transmitter and/or an IR receiver to transmit and/or receive an IR signal based on IR communication standards. Through the IR transmitter and/or the IR receiver, the wireless interface 112 may receive or input therein a remote control signal from a remote controller or another external device, or transmit or output the remote control signal to another external device. Alternatively, the electronic apparatus 100 may exchange the remote control signal with the remote controller or other external devices through the wireless interface 112 of different standards such as Wi-Fi, Bluetooth, etc.

When the video/audio signal received through the interface 110 is a broadcast signal, the electronic apparatus 100 may further include a tuner to be tuned to a channel for the received broadcast signal.

The electronic apparatus 100 may include a display 120. The display 120 includes a display panel capable of displaying an image on a screen. The display panel is provided to have a light receiving structure such as a liquid crystal type, or a self-emissive structure such as an organic light emitting diode (OLED) type. The display 120 may include an additional element according to the structures of the display panel. For example, when the display panel is the liquid crystal type, the display 120 includes a liquid crystal display panel, a backlight unit configured to emit light, and a panel driving substrate configured to drive liquid crystal of the liquid crystal display panel.

The electronic apparatus 100 may include a user input unit 130. The user input unit 130 includes circuitry related to various input interfaces provided to make a user input. The user input unit 130 may be variously configured according to the kinds of the electronic apparatus 100, and may for example include a mechanical or electronic button of the electronic apparatus 1, the remote controller separated from the electronic apparatus 100, an input unit provided in an external device connected to the electronic apparatus 100, a touch pad, a touch screen installed in the display 120, etc.

The electronic apparatus 100 may include a storage unit 140. The storage unit 140 is configured to store digitalized data. The storage unit 140 includes a nonvolatile storage in which data is retained regardless of whether power is on or off, and a volatile memory into which data to be processed by a processor 180 is loaded and in which data is retained only when power is on. The storage includes a flash memory, a hard-disc drive (HDD), a solid-state drive (SSD), a read only memory (ROM), etc., and the memory includes a buffer, a random-access memory (RAM), etc.

The electronic apparatus 100 may include a microphone 150. The microphone 150 collects a voice of a user and the like sounds from external environments. The microphone 150 transmits a signal based on a collected sound to the processor 180. The electronic apparatus 100 may include the microphone 150 for collecting a voice of a user, or receive an audio signal from the remote controller, the smartphone or the like external apparatus including the microphone through the interface 110. The external apparatus 200 may be installed with a remote-control application to control the electronic apparatus 100 or perform voice recognition or the like function. With such an installed application, the external apparatus 200 can receive a voice of a user, and the external apparatus 200 can exchange data with the electronic apparatus 100 and control the electronic apparatus 100 through Wi-Fi/Bluetooth, IR, etc. Thus, a plurality of interfaces 110 corresponding to the communication methods may be present in the electronic apparatus 100.

The electronic apparatus 100 may include a loudspeaker 160. The loudspeaker 160 outputs a sound based on audio data processed by the processor 180. The loudspeaker 160 includes a unit loudspeaker provided corresponding to audio data of a certain audio channel, and thus may include a plurality of unit loudspeakers respectively corresponding to the audio data of the plurality of audio channels. According to an alternative embodiment, the loudspeaker 160 may be provided separately from the electronic apparatus 100, and the electronic apparatus 100 in this case may transmit the audio data to the loudspeaker 160 through the interface 110.

The electronic apparatus 100 may include a sensor 170. The sensor 170 includes an acceleration sensor, a gyro sensor, etc. The processor 180 may store a sensing value, which is defined as a user taps the external apparatus 200 with the electronic apparatus 100, in the storage unit 140. In future when the user event is detected, the processor 180 may identify whether the user event occurs based on whether the detected sensing value corresponds to the stored sensing value.

The electronic apparatus 100 may include the processor 180. The processor 180 includes one or more hardware processors embodied as a central processing unit (CPU), a chipset, a buffer, a circuit, etc. which are mounted onto a printed circuit board, and may be embodied as a system on chip (SoC). When the electronic apparatus 100 is embodied as a display apparatus, the processor 180 includes modules corresponding to various processes, such as a demultiplexer, a decoder, a scaler, an audio digital signal processor (DSP), an amplifier, etc. Here, some or all of such modules may be embodied as an SOC. For example, the demultiplexer, the decoder, the scaler and the like video processing modules may be embodied as a video processing SOC, and the audio DSP may be embodied as a chipset separately from the SOC.

The processor 180 may convert an audio signal into audio data when the audio signal about a voice of a user is obtained through the microphone 150 or the like. In this case, the audio data may include text data obtained by a speech-to-text (STT) process that converts an audio signal into text data. The processor 180 identifies a command issued by the audio data, and performs an operation based on the identified command. Both the process for the audio data and the process for the command may be performed in the electronic apparatus 100. However, the electronic apparatus 100 in this case is required to have so large system load and storage capacity that at least some processes may be performed by at least one server connecting and communicating with the electronic apparatus 100 through a network.

The processor 180 according to the disclosure may call and execute at least one instruction among one or more software instructions stored in a machine-readable storage medium which is readable by the electronic apparatus 100 or the like. This enables the electronic apparatus 100 or the like apparatus to operate and perform at least one function based on the at least one called instruction. The one or more instructions may include a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium.

Meanwhile, the processor 180 may identify content to be transmitted and a method of transmitting content, based on the current operation circumstances of the electronic apparatus 100, and may use at least one of a machine learning, neural network, or deep learning algorithm as a rule-base or artificial intelligence (AI) algorithm to perform at least a part of data analysis, process or result information generation for transmitting the content to the external apparatus through the interface 100 based on the identified content-transmission method.

For example, the processor 180 may function as both a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit 140 or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the foregoing operations. The target data may be obtained from the storage unit 140 or from the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

The control method may be provided as involved in a computer program product. The computer program product may include software instructions to be executed by the processor 180 as described above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

Figure 3:
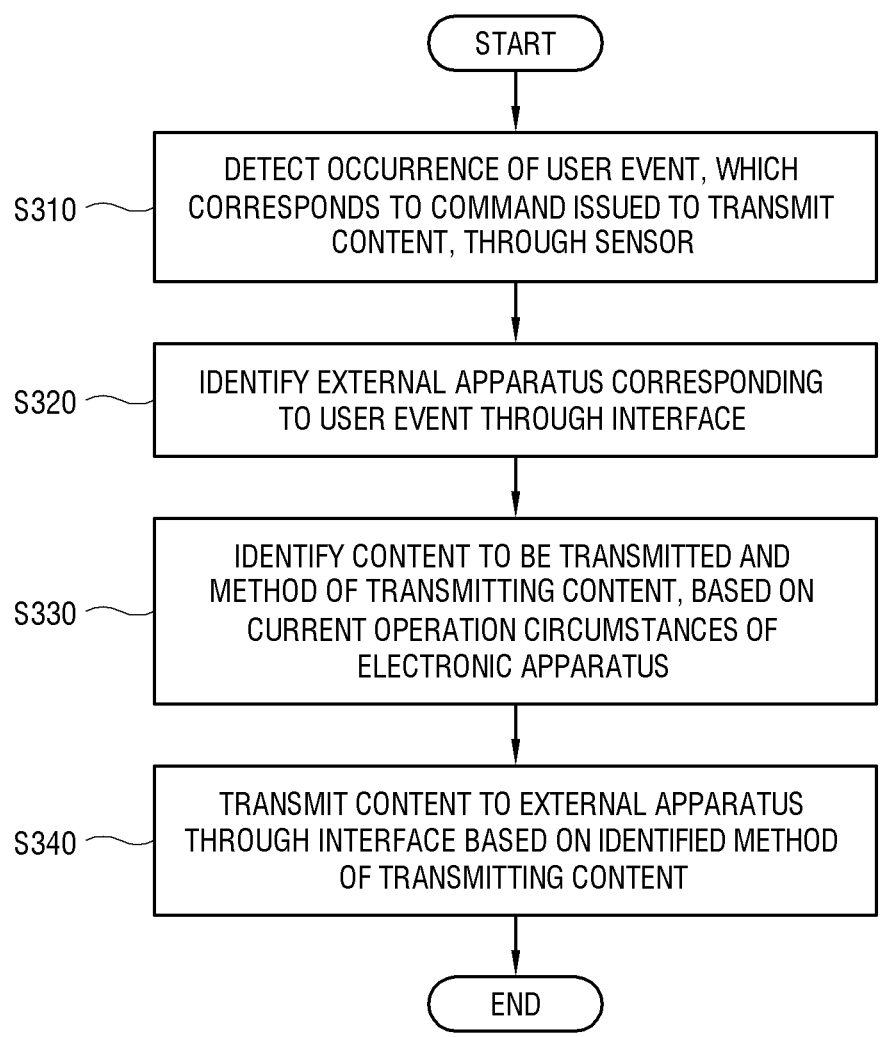
FIG. 3 is a flowchart showing operations of an electronic apparatus according to an embodiment of the disclosure.

FIG. 3 is a flowchart showing operations of an electronic apparatus according to an embodiment of the disclosure.

The processor 180 may detect occurrence of a user event, which corresponds to a command issued to transmit content, through the sensor 170 (S310). Here, the content includes any content, which can be transmitted to and used by another apparatus, such as a picture, video data, audio data, and the like, without being limited to one of them. Further, the user event corresponding to the command issued to transmit the content refers to a simple and intuitive method of connecting the electronic apparatus 100 and the external apparatus 200 when the content running or being displayed in the electronic apparatus 100 is desired by a user to run or be displayed in the external apparatus 200. In this case, the user event may include the tap as shown in FIG. 1, but the tap is merely one of many available operations as described above. Thus, a gesture, a touch, voice recognition, etc. may be variously applied to the user event.

The processor 180 may identify whether the user event occurs based on whether the sensing value detected by the sensor 170 corresponds to the sensing value previously defined as a user tapped the external apparatus 200 with the electronic apparatus 100. Therefore, the processor 180 may previously define the sensing value corresponding to a user's tap between the electronic apparatus 100 and the external apparatus 200, and detect variations in x, y and z axes through the sensor 170 in real time. When detecting the variation corresponding to the previously defined sensing value, the sensor 170 may transmit data about the detected variation to the processor 180. The processor 180 may identify the occurrence of the user event based on the received data.

The processor 180 may identify the external apparatus 200 corresponding to the user event through the interface 110 (S320). To identify the external apparatus 200 in which the user event occurs, the processor 180 may employ BLE technology as one of low power communication technologies. The BLE technologies include an advertise mode and a connection mode. In the advertise mode, a process is performed to transmit a signal for informing the presence of the apparatus or search for a signal of another apparatus. In the connection mode, one of the apparatuses found in the advertise mode is selected and then connected by one-to-one. When the sensor 170 detects that the user event such as the tap occurs in the electronic apparatus 100, the processor 180 may search for a signal from peripheral apparatuses through the BLE technology. When the electronic apparatus 100 transmits information, which is to identify whether the user event occurs, to the found peripheral apparatuses, i.e., to the external apparatus 200, the external apparatus 200 which detects the same user event may transmit information, which is to identify the detection of the same user event, to the electronic apparatus 100. Eventually, the processor 180 may identify the external apparatus 200 corresponding to the user event based on whether the information obtained by the sensor 170 matches the information obtained by the sensor of the external apparatus 200.

The processor 180 may identify content to be transmitted and a method of transmitting content, based on the current operation circumstances of the electronic apparatus 100 (S330). As the method of transmitting the content, there are screen mirroring, sound mirroring, casting, etc. The method of transmitting content may be varied depending on the kinds of content, and there may be various transmission methods with regard to one kind of content.

For example, in a case of a moving image, comparison between the mirroring and the casting may be taken into account. Both the mirroring and the casting are all related to the technology that makes an image being displayed on the electronic apparatus 100 be displayed on the external apparatus 200. In a case of the mirroring, the electronic apparatus 100 for transmitting content processes the content, and the external apparatus 200 for receiving the content simply receives and outputs the content. Therefore, the quality of the content may be varied depending on the processing performance and the likes of the electronic apparatus 100 for transmitting the content. Further, a network condition between the electronic apparatus 100 and the external apparatus 200 is also required to be taken into account. For example, lack of an available bandwidth may cause limited quality.

Further, in a case that the electronic apparatus 100 is a mobile phone, when a call, a message, etc. comes in the mobile phone, a notice popped up on the screen of the mobile phone may be directly displayed on a moving image even while the moving image is being reproduced on the external apparatus 200 because the mirroring directly shows the screen of the mobile phone.

On the other hand, in a case of the casting, the electronic apparatus 100 specifies content, and the external apparatus 200 for receiving the content directly processes and outputs the content. For example, when the electronic apparatus 100 makes a request for the casting of a moving image being reproduced in the electronic apparatus 100 to a server, the server transmits source information such as a uniform resource locator (URL), etc. of the moving image to the external apparatus 200 so that the external apparatus 200 can access a corresponding URL address and reproduce the moving image.

Therefore, the quality of the content in the casting may be varied depending on the processing performance and the likes of the external apparatus 200 for receiving the content. Further, the casting has higher degrees of freedom for the quality limited by the network condition than the mirroring because a route for obtaining content in the casting is not specified like that of the mirroring but variously selectable.

However, the casting is executable only when a platform of providing content supports the casting. On the other hand, the mirroring has high accessibility because it is possible to copy the screen itself displayed on the electronic apparatus 100 and display the copied screen on the external apparatus 200. Thus, both of the casting and the mirroring have merits and demerits.

Therefore, the processor 180 may identify the current operation circumstances of the electronic apparatus 100 and identify the method of transmitting the content. For example, when the content is a moving image and the moving image is running in a platform supporting the casting, the processor 180 may identify the method of transmitting the content as the casting.

After identifying the current operation circumstances of the electronic apparatus 100 and identifying the content and the method of transmitting the content, the processor 180 may transmit the content to the external apparatus 200 through the interface 110 based on the identified method of transmitting the content (S340).

In addition, when the external apparatus 200 executes the content received based on the identified method of transmitting the content, an account of the external apparatus 200 may not interwork with that of the electronic apparatus 100. In this case, the processor 180 may perform operation for interworking between the account of the electronic apparatus 100 and the account of the external apparatus 200 through the interface 110. When user authentication such as login, etc. is needed, the processor 180 may display a notice requesting a user's authentication on the display 120.

According to an embodiment of the disclosure, a user can connect electronic apparatuses by only a simple operation even though the user does not fully understand the method of transmitting content between the apparatuses, and the content can be transmitted to the external apparatus by automatically identifying the optimum method of transmitting the content based on the operation circumstances of the electronic apparatus for transmitting the content, thereby providing enhanced usefulness to a consumer.

Figure 4:
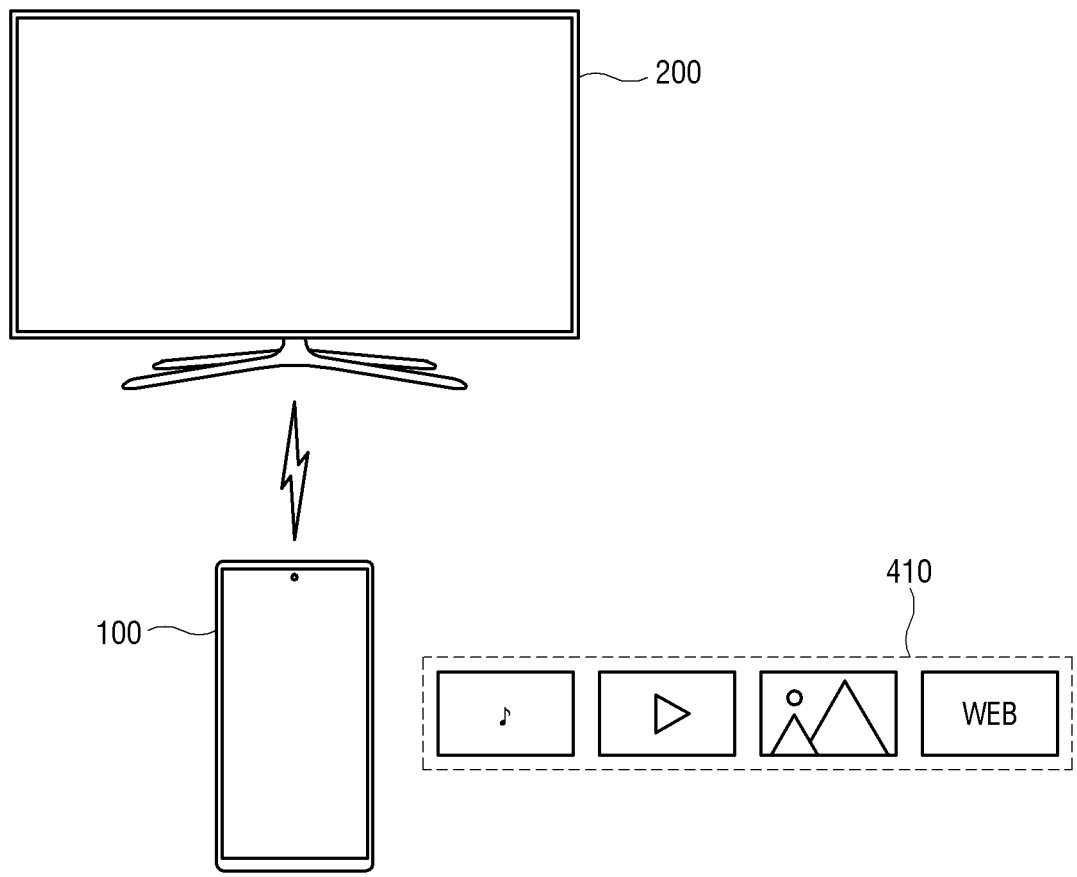
FIG. 4 illustrates an operation of an electronic apparatus according to an embodiment of the disclosure.

FIG. 4 illustrates an operation of an electronic apparatus according to an embodiment of the disclosure. FIG. 4 shows the electronic apparatus 100, the external apparatus 200, and a plurality of applications 410 executable in the electronic apparatus 100. The processor 180 may identify an application currently running in the electronic apparatus 100, and identify a content-transmission method based on the identified application.

For example, when a music-play application is running in the electronic apparatus 100, the processor 180 may identify the running application and identify the sound mirroring as a method of transmitting audio content. Further, when a moving-image streaming platform capable of supporting the casting is running in the electronic apparatus 100, the processor 180 may identify the casting as a method of transmitting video content being currently reproduced. When a gallery application is used for viewing pictures, a web browser is used for surfing the Web, or a game application is used for playing a game, etc. in the electronic apparatus 100, the screen mirroring may be identified as the method of transmitting content. However, the foregoing embodiments are merely examples, and the disclosure is not limited to one of them.

In addition, the electronic apparatus 100 may further include the storage unit 140, and the processor 180 may store information about the content-transmission methods corresponding to the previous operation circumstances of the electronic apparatus 100 in the storage unit 140 and identify the content-transmission method matching the current operation circumstance of the electronic apparatus 100 based on the stored information. For example, in a case where a moving image is reproduced by a platform of supporting the casting based on the occurrence of the user event between the electronic apparatus 100 and the external apparatus 200, when not the casting but the mirroring has run in the previous operation circumstances stored in the storage unit 140, the processor 180 may execute the mirroring. Further, the processor 180 may receive information about the transmission methods used by other users and the likes from the server and store the information in the storage unit 140 or obtain information in real time of the electronic apparatus 100, thereby identifying the method of transmitting the content according to the current operation circumstances.

The processor 180 may use the current or previous operation circumstances of the electronic apparatus 100, the use information of other users, and an AI model obtained by learning in consideration of overall circumstances as well as individual pieces of information such as a user input, etc., thereby selecting an optimum transmission method as ultimately intended by a user based on the current circumstances, a user's preference, etc.

According to an embodiment of the disclosure, the electronic apparatus 100 readily grasps the current operation circumstances by identifying an application currently running in the apparatus, and thus easily selects content to be transmitted and the method of transmitting the corresponding content.

Figure 5:
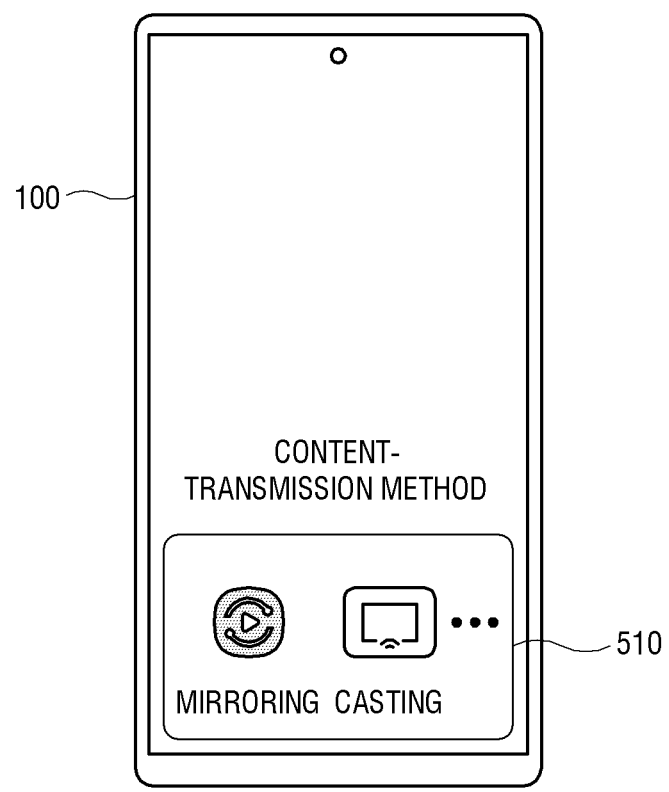
FIG. 5 illustrates an operation of an electronic apparatus according to an embodiment of the disclosure.

FIG. 5 illustrates an operation of an electronic apparatus according to an embodiment of the disclosure. The electronic apparatus 100 may further includes the user input unit 130, and the processor 180 may identify the method of transmitting the content based on a user input received in the user input unit 130. As described above, there may be a plurality of content-transmission methods with respect to one piece of content. Therefore, the processor 180 may control the display 120 to display a graphic user interface (GUI) for selecting one among the plurality of content-transmission methods. The processor 180 may receive a user input, which is to select one among the plurality of content-transmission methods displayed on the GUI, through the user input unit 130.

For example, when content desired to be transmitted is transmittable by the mirroring and the casting, the processor 180 may control the display 120 of the electronic apparatus 100 to display a GUI 510 for selecting the content-transmission method.

According to an embodiment of the disclosure, the processor 180 may select the content-transmission method automatically based on the current operation circumstances of the electronic apparatus, also may reflect a user's intention, thereby making up for a case where a user's intention is not anticipated.

FIG. 6 is a flowchart showing operations of an electronic apparatus according to an embodiment of the disclosure. According to an embodiment of the disclosure, the operations of the external apparatus 200 described with reference to FIGS. 1 to 5 are illustrated. In this case, the terms "electronic apparatus" and "external apparatus" are merely given for convenience of description. Therefore the "external apparatus" may be called the "electronic apparatus," and the opponent "electronic apparatus" may also be called the "external apparatus." Unless otherwise described, the "external apparatus" in this embodiment has the same or similar configuration to the "electronic apparatus" according to the embodiments described with reference to FIGS. 1 to 5.

The processor of the external apparatus 200 may detect occurrence of a user event, which corresponds to a command issued to transmit content, through the sensor (S610).

When the user event occurs, the processor of the external apparatus 200 may transmit information for identifying the external apparatus 200 corresponding to the user event to the electronic apparatus 100 through the interface (S620). This operation refers to the operation S320 of FIG. 3, in which the electronic apparatus using the BLE technology to transmit the content identifies the opponent apparatus, i.e., the external apparatus 200 where the event occurs. The external apparatus 200 may transmit data detected by its own sensor to the electronic apparatus 100 according to various circumstances where the electronic apparatus 100 cannot identify the external apparatus 200, it takes a time to identify the external apparatus 200, etc. The electronic apparatus 100 may identify the external apparatus 200 corresponding to the user event, based on the sensor-detection data received from the external apparatus 200.

The processor of the external apparatus 200 may transmit information about the current operation circumstances of the external apparatus 200, which is to identify the content to be transmitted and the method of transmitting the content based on the user event, to the electronic apparatus 100 through the interface (S630). Although it is important to identify the current operation circumstances of the apparatus for transmitting the content, it is also meaningful to identify the current operation circumstances of the external apparatus for receiving and executing the content. Therefore, the electronic apparatus 100 may identify the content to be transmitted and the method of transmitting the content with reference to all pieces of information about the current operation circumstances of the external apparatus 200 received from the external apparatus 200. For example, in a case where the external apparatus 200 is not connected to the identified electronic apparatus 100 where the user event is detected, but it has already been connected to another apparatus by the sound mirroring, the electronic apparatus 100 is not connectable to the external apparatus 200 unless the connection for the sound mirroring between the connected apparatus and the external apparatus 200 is released. Therefore, the processor of the external apparatus 200 may transmit information about the circumstances, in which the external apparatus 200 is being currently connected to another apparatus and thus not connectable to the electronic apparatus 100, to the electronic apparatus 100 through the interface. The electronic apparatus 100 may stop transmitting the content, based on the information about the current circumstances of the external apparatus 200.

According to another embodiment of the disclosure, the electronic apparatus 100 may display a notice of information reception through the display 120 so that a user can recognize circumstances, when receiving information about the circumstances through the interface 110.

According to still another embodiment of the disclosure, the processor of the external apparatus 200 may transmit information about the current operation circumstances of the external apparatus 200, which shows one among a plurality of content-transmission methods, to the electronic apparatus 100. For example, when the electronic apparatus 100 can use both the mirroring and the casting to transmit a moving image but the external apparatus 200 can use only one of the mirroring and the casting to receive content because of the processing performance or the like apparatus environments, the external apparatus 200 may transmit such information to the electronic apparatus 100. The electronic apparatus 100 may receive such information from the external apparatus 200, and use the content-transmission method, by which the external apparatus 200 can receive content, to transmit the content.

The processor of the external apparatus 200 may receive, through the interface, the content, which is transmitted by the identified content-transmission method, from the electronic apparatus 100 and process the received content (S640). For example, when receiving a picture by the screen mirroring from the electronic apparatus 100, the external apparatus 200 may display the received picture on the display thereof.

According to an embodiment of the disclosure, it is also possible to grasp the operation circumstances of the external apparatus 200 for receiving content, thereby helping the electronic apparatus 100 for transmitting the content identify the content-transmission method. Further, the electronic apparatus 100 informs a user of the operation circumstances of the external apparatus 200 by displaying on the display, thereby helping the user's understanding and providing improved convenience to the user when the content transmission is not properly implemented.

Even though a user lacks understanding a method of transmitting content between the apparatuses, simple control is enough to make the electronic apparatus automatically interwork with the external apparatus by an optimum connection method appropriate to suit the operation circumstances of the electronic apparatus for transmitting the content, thereby providing enhanced usefulness to a consumer.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
an interface;
a sensor; and
a processor configured to:
detect occurrence of a user event, which corresponds to a command issued to transmit content, through the sensor while the content is reproduced by using an application currently running in the electronic apparatus,
identify an external apparatus, which corresponds to the user event, through the interface,
identify the content and the application currently running in the electronic apparatus to reproduce the content among a plurality of applications,
identify a method of transmitting the content among a plurality of methods of transmitting the content based on the identified application, wherein the identifying of the method of transmitting the content comprises identifying whether mirroring or casting is to be used, and
transmit the content to the external apparatus through the interface based on the identified method of transmitting the content.

2. The electronic apparatus according to claim 1, wherein the processor is configured to identify whether the user event occurs, based on whether a sensing value detected by the sensor corresponds to a sensing value which was previously defined based on a user tapping the external apparatus by using the electronic apparatus.

3. The electronic apparatus according to claim 1, wherein the processor is configured to identify the external apparatus corresponding to the user event, based on whether information obtained through the sensor corresponds to information obtained in the external apparatus by a sensor of the external apparatus.

4. The electronic apparatus according to claim 1, further comprising a user input unit,
wherein the processor is configured to identify the method of transmitting the content based on a user input received through the user input unit.

5. The electronic apparatus according to claim 1, further comprising a storage unit,
wherein the processor is configured to:
store information about at least one method of transmitting the content, which correspond to the plurality of applications executable in the electronic apparatus based on previous operation circumstances of the electronic apparatus, in the storage unit, and
identify the method of transmitting the content, which corresponds to the application currently running in the electronic apparatus, based on the stored information.

6. The electronic apparatus according to claim 1, wherein the processor is configured to:
receive information about current operation circumstances of the external apparatus through the interface, and
identify the content and the method of transmitting the content, based on the received information about the current operation circumstances of the external apparatus.

7. An electronic apparatus comprising:
an interface;
a sensor; and
a processor configured to:
detect occurrence of a user event, which corresponds to a command issued to transmit content, through the sensor while the content is reproduced by using an application currently running in an external apparatus,
transmit information, which allows the external apparatus to identify the electronic apparatus corresponding to the user event, to the external apparatus through the interface,
transmit information about current operation circumstances of the electronic apparatus, which is to identify the content and the application currently running in the external apparatus to reproduce the content among a plurality of applications, and to identify a method of transmitting the content among a plurality of methods of transmitting the content based on the identified application, to the external apparatus through the interface, wherein the identifying of the method of transmitting the content comprises identifying whether mirroring or casting is to be used, and
receive, through the interface, the content transmitted from the external apparatus based on the identified method of transmitting the content and process the received content.

8. The electronic apparatus according to claim 7, wherein the information about the current operation circumstances of the electronic apparatus indicates one content-transmission method among a plurality of content-transmission methods.

9. The electronic apparatus according to claim 7, wherein the processor is further configured to identify whether the user event occurs, based on whether a sensing value detected by the sensor corresponds to a sensing value which was previously defined based on a user tapping the electronic apparatus by using the external apparatus.

10. A method of controlling an electronic apparatus, comprising:
detecting occurrence of a user event, which corresponds to a command issued to transmit content, through a sensor of the electronic apparatus while the content is reproduced by using an application currently running in the electronic apparatus;
identifying an external apparatus, which corresponds to the user event, through an interface of the electronic apparatus;
identifying the content and the application currently running in the electronic apparatus to reproduce the content among a plurality of applications;
identifying a method of transmitting the content among a plurality of methods of transmitting the content based on the identified application, wherein the identifying of the method of transmitting the content comprises identifying whether mirroring or casting is to be used; and
transmitting the content to the external apparatus through the interface based on the identified method of transmitting the content.

11. The method according to claim 10, wherein the detecting the occurrence of the user event comprises identifying whether the user event occurs based on whether a sensing value detected by the sensor corresponds to a sensing value which was previously defined based on a user tapping the external apparatus with the electronic apparatus.

12. The method according to claim 10, wherein the identifying the external apparatus corresponding to the user event comprises identifying the external apparatus corresponding to the user event, based on whether information obtained through the sensor corresponds to information obtained in the external apparatus by a sensor of the external apparatus.

13. The method according to claim 10, wherein the identifying the method of transmitting the content comprises identifying the method of transmitting the content based on a user input received through a user input unit.

14. The method according to claim 10, wherein the identifying the method of transmitting the content comprises:
storing information about at least one method of transmitting the content, which correspond to the plurality of applications executable in the electronic apparatus based on previous operation circumstances of the electronic apparatus, in a storage unit; and
identifying the method of transmitting the content, which corresponds to the application currently running in the electronic apparatus, based on the stored information.

15. The method according to claim 10, wherein the identifying the content and the application currently running in the electronic apparatus comprises receiving information about current operation circumstances of the external apparatus through the interface, and wherein the identifying of the method of transmitting the content comprises identifying the method of transmitting the content, based on the received information about the current operation circumstances of the external apparatus.

16. A method of controlling an electronic apparatus, comprising:

detecting occurrence of a user event, which corresponds to a command issued to transmit content, through a sensor of the electronic apparatus while the content is reproduced by using an application currently running in an external apparatus, transmitting information, which allows the external apparatus to identify the electronic apparatus corresponding to the user event, to the external apparatus through an interface of the electronic apparatus, transmitting information about current operation circumstances of the electronic apparatus, which is to identify the content and the application currently running in the external apparatus to reproduce the content among a plurality of applications, and to identify a method of transmitting the content among a plurality of methods of transmitting the content based on the identified application, to the external apparatus through the interface, wherein the identifying of the method of transmitting the content comprises identifying whether mirroring or casting is to be used, and receiving, through the interface, the content transmitted from the external apparatus based on the identified method of transmitting the content and processing the received content.

17. The method according to claim 16, wherein the information about the current operation circumstances of the electronic apparatus indicates one content-transmission method among a plurality of content-transmission methods.

18. The method according to claim 16, wherein the detecting the occurrence of the user event comprises identifying whether the user event occurs based on whether a sensing value detected by the sensor corresponds to a sensing value which was previously defined based on a user tapping the electronic by using the external apparatus.

19. A non-transitory recording medium stored with a computer program comprising a computer readable code as a code for performing a method of controlling an electronic apparatus, the method of controlling the electronic apparatus comprising:

detecting occurrence of a user event, which corresponds to a command issued to transmit content, through a sensor of the electronic apparatus while the content is reproduced by using an application currently running in the electronic apparatus;

identifying an external apparatus, which corresponds to the user event, through an interface of the electronic apparatus;

identifying the content and the application currently running in the electronic apparatus to reproduce the content among a plurality of applications;

identifying a method of transmitting the content among a plurality of methods of transmitting the content based on the identified application, wherein the identifying of the method of transmitting the content comprises identifying whether mirroring or casting is to be used; and transmitting the content to the external apparatus through the interface based on the identified method of transmitting the content.

20. The non-transitory recording medium according to claim 19, wherein the detecting the occurrence of the user event comprises identifying whether the user event occurs based on whether a sensing value detected by the sensor corresponds to a sensing value which was previously defined based on a user tapping the external apparatus with the electronic apparatus.

21. A non-transitory recording medium stored with a computer program comprising a computer readable code as a code for performing a method of controlling an electronic apparatus, the method of controlling the electronic apparatus comprising:

detecting occurrence of a user event, which corresponds to a command issued to transmit content, through a sensor of the electronic apparatus while the content is reproduced by using an application currently running in an external apparatus, transmitting information, which allows the external apparatus to identify the electronic apparatus corresponding to the user event, to the external apparatus through an interface of the electronic apparatus, transmitting information about current operation circumstances of the electronic apparatus, which is to identify the content and the application currently running in the external apparatus to reproduce the content among a plurality of applications, and to identify a method of transmitting the content among a plurality of methods of transmitting the content based on the identified application, to the external apparatus through the interface, wherein the identifying of the method of transmitting the content comprises identifying whether mirroring or casting is to be used, and receiving, through the interface, the content transmitted from the external apparatus based on the identified method of transmitting the content and processing the received content.

22. The non-transitory recording medium according to claim 21, wherein the detecting the occurrence of the user event comprises identifying whether the user event occurs based on whether a sensing value detected by the sensor corresponds to a sensing value which was previously defined based on a user tapping the electronic apparatus with the external apparatus.

* * * * *